(12) United States Patent
Ziech et al.

(10) Patent No.: US 7,258,644 B2
(45) Date of Patent: Aug. 21, 2007

(54) TANDEM AXLE CARRIER STRUCTURAL RIB

(75) Inventors: James F. Ziech, Kalamazoo, MI (US); Glen Peterson, Portage, MI (US); James Ridge, Portage, MI (US)

(73) Assignee: Dana Corporation, Toledo, OH (US)

( * ) Notice: Subject to any disclaimer, the term of this patent is extended or adjusted under 35 U.S.C. 154(b) by 484 days.

(21) Appl. No.: 10/610,143

(22) Filed: Jun. 30, 2003

(65) Prior Publication Data

US 2004/0266579 A1 Dec. 30, 2004

(51) Int. Cl.
*F16H 48/06* (2006.01)
*F16H 57/02* (2006.01)

(52) U.S. Cl. .................... 475/221; 74/606 R

(58) Field of Classification Search ............. 74/606 R; 475/221–2, 207, 332, 230
See application file for complete search history.

(56) References Cited

U.S. PATENT DOCUMENTS

| | | | |
|---|---|---|---|
| 1,523,060 A | 1/1925 | Eckart | |
| 2,056,881 A | 10/1936 | Alden | |
| 2,112,811 A | 3/1938 | Hendrickson | |
| 2,309,162 A | 1/1943 | Buckendale | |
| 2,356,180 A | 8/1944 | Roos | |
| 2,510,996 A | 6/1950 | Morgan | |
| RE25,269 E | * 10/1962 | Christie | ............ 475/221 |
| 5,267,489 A | * 12/1993 | Ziech | ............ 74/606 R |
| 5,950,750 A | 9/1999 | Dong et al. | |
| 6,014,915 A | * 1/2000 | Evans | ............ 74/606 R |
| 6,122,994 A | * 9/2000 | Norfolk et al. | ............ 74/606 R |
| 6,245,415 B1 | * 6/2001 | Keller et al. | ............ 428/188 |
| 6,253,640 B1 | * 7/2001 | Phillips | ............ 74/606 R |
| 6,514,169 B2 | * 2/2003 | Turner et al. | ............ 475/222 |
| 6,628,026 B2 | * 9/2003 | Torii et al. | ............ 310/75 R |
| 2002/0177501 A1 | 11/2002 | Turner et al. | |

OTHER PUBLICATIONS

Dana Corporation, "The 404 Tandem Axle Family", 2 pps., Copyright 2001.
ArvinMeritor,Inc., Tandem Drive Axles, 8 pps., Copyright 1998.

* cited by examiner

*Primary Examiner*—Roger Pang
(74) *Attorney, Agent, or Firm*—Dykema Gossett PLLC

(57) ABSTRACT

A differential carrier housing having both reduced weight and improved strength along the operational load path of the housing is provided. The housing includes a hollow rib that extends from a forward end rearward of an outer bearing for an input shaft to a rear end at a flange on the carrier housing that is connected to an axle housing.

16 Claims, 8 Drawing Sheets

TANDEM AXLE CARRIER STRUCTURAL RIB

BACKGROUND OF THE INVENTION

1. Field of the Invention

This invention relates to drive axle assemblies and, in particular, to the structure of a differential carrier housing.

2. Disclosure of Related Art

A conventional tandem axle assembly includes forward and rear drive axle assemblies. The forward and rear drive axle assemblies each include a pair of axle half shafts extending therefrom on which one or more wheels of a vehicle are mounted. Each of the forward and rear drive axle assemblies further includes a differential gear set that allows the vehicle wheels on each axle assembly to rotate at different speeds. Further, one of the forward and rear drive axle assemblies generally includes means, such as an inter-axle differential, for dividing power between the forward and rear drive axle assemblies.

Conventional drive axle assemblies have a significant disadvantage. The drive axle assembly housing the inter-axle differential typically includes at least a differential carrier housing and an axle housing. The differential carrier housing typically houses a pinion shaft, the inter-axle differential, and an input shaft among other components. In operation, a load path is created between the internal components of the drive axle assembly, resulting in stress being applied to the body of the differential carrier housing. Therefore, the carrier housing must be of suitable strength to withstand this load and, as a result, conventional carrier housings are relatively heavy and produce undesirable effects such as lower fuel efficiency.

The inventors herein have recognized a need for a differential carrier housing that will minimize and/or eliminate one or more of the above-identified deficiencies.

SUMMARY OF THE INVENTION

The present invention provides a differential carrier housing.

A differential carrier housing in accordance with the present invention includes a body disposed about an axis and having first and second axial ends. The body is configured to receive a pinion shaft, an inter-axle differential, and an input shaft supported on an input shaft bearing. A differential carrier housing according to the present invention further includes a radially extending flange extending from the body proximate the second axial end of the body. The flange is configured for connection to an axle housing. A differential carrier housing in accordance with the present invention further includes a hollow rib extending from a forward end located on the body rearward of the input shaft bearing to a rear end located at the flange.

A differential carrier housing in accordance with the present invention has significant advantages as compared to conventional differential carrier housings. In particular, the use, and location of, the hollow rib provides increased strength to the body of the differential carrier housing, especially along the load path created during operation of the axle assembly. At the same time, because the rib is hollow, it also reduces the weight of the carrier housing compared to conventional housings that are configured with solid ribs.

These and other features and objects of this invention will become apparent to one skilled in the art from the following detailed description and the accompanying drawings illustrating features of this invention by way of example.

DETAILED DESCRIPTION OF THE PREFERRED EMBODIMENT

Figure 1:
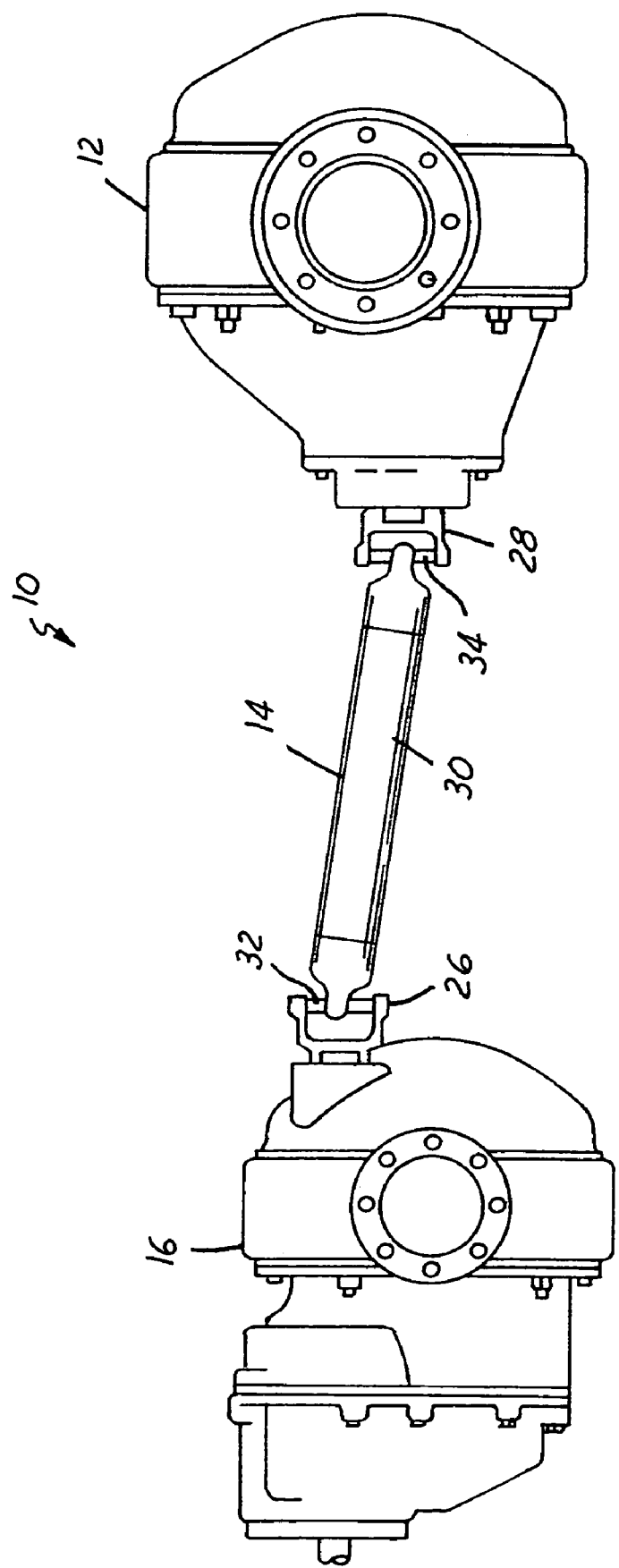
FIG. 1 is a side view of a tandem axle assembly.

Referring now to the drawings wherein like reference numerals are used to identify identical components in the various views, FIG. 1 illustrates a tandem axle assembly 10. Assembly 10 transmits torque from a vehicle powertrain to the wheels of the vehicle on two parallel axles. Assembly 10 is configured for use in heavy trucks. It should be understood, however, that assembly 10 may fine use in a variety of conventional vehicles. Tandem axle assembly 10 includes a rear axle assembly 12, an intermediate drive shaft assembly 14, and a forward axle assembly 16.

Figure 2:
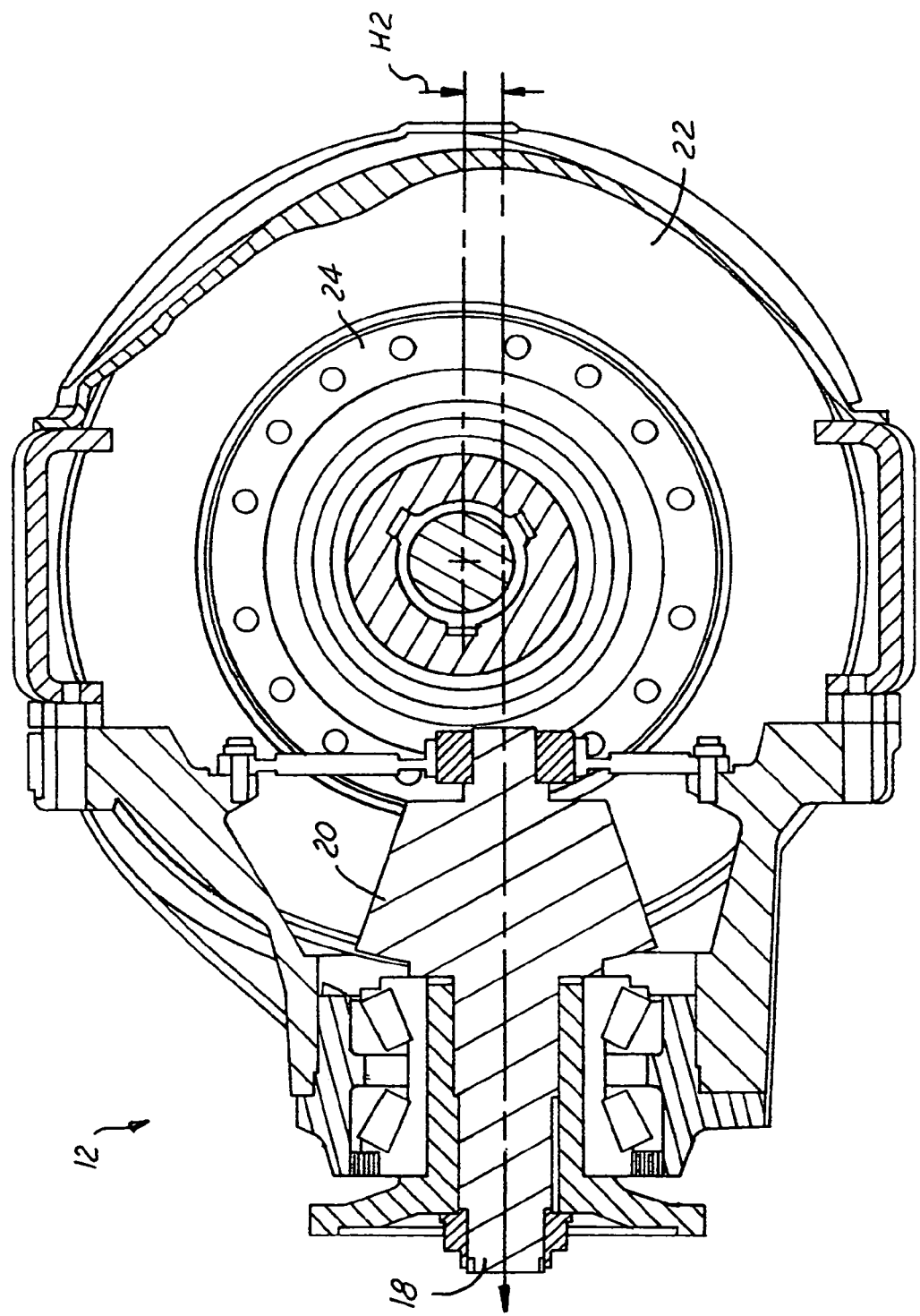
FIG. 2 is a cross-sectional view of the rear axle assembly of the tandem axle assembly of FIG. 1.

Referring now to FIG. 2, rear axle assembly 12 is provided to drive wheels (not shown) supported on either side of assembly 12 on axle half shafts (not shown) extending from axle assembly 12. Assembly 12 is conventional in the art and includes a pinion shaft 18 and pinion gear 20 that transfer torque from drive shaft assembly 14 to a ring gear 22 and a wheel differential 24 used to divide power between the axle half shafts.

Referring again to FIG. 1, drive shaft assembly 14 is provided to transfer torque from an output shaft of forward axle assembly 16 to rear axle assembly 12. Assembly 14 may include an output yoke 26 at a forward end, an input yoke 28 at a rear end, an intermediate drive shaft 30 between yokes 26, 28 and conventional universal joints 32, 34 for coupling drive shaft 30 to yokes 26, 28

Figure 3:
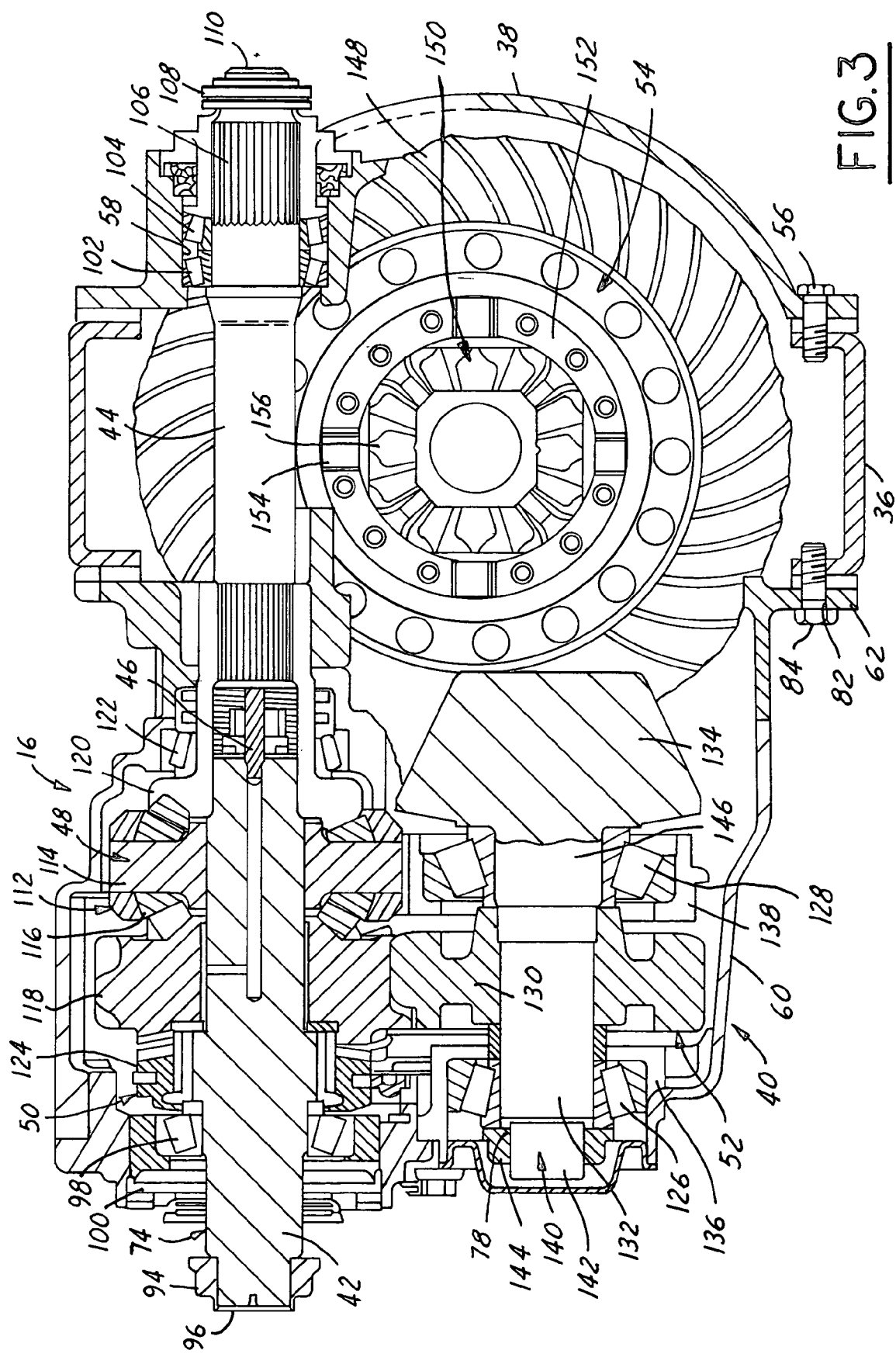
FIG. 3 is a cross sectional view of the forward axle assembly of the tandem axle assembly of FIG. 1.

Referring now to FIG. 3, forward axle assembly 16 is provided to drive wheels (not shown) supported on either side of assembly 16 on axle half shafts (not shown) extending from axle assembly 16. Axle assembly 16 has a forward end (the left side in FIG. 1) and a rear end (the right side in FIG. 1) and may include the following elements: a housing including axle housing 36, a rear housing 38, and a differential carrier housing 40; an input shaft 42; an output shaft 44; a pump 46; means, such as an inter-axle differential 48, for dividing power between assembly 12 and assembly 16, a differential locking device, such as clutch 50, a pinion shaft assembly 52, and a differential gear assembly 54.

Housings 36, 38, 40 provide structural support for the other components of assembly 16. Housings 36, 38, 40 also protect the other components of assembly 16 from foreign objects and elements. Housings 36, 38, 40 may be made from conventional metals and metal alloys such as steel.

Housings 36, 38 are configured to receive wheel differential gear assembly 54 and may be coupled together using conventional fasteners 56 such as screws or bolts. Axle housing 36 defines a pair of openings (not shown) from which axle half shafts extend. The axle half shafts may support the vehicle wheels. Alternatively, the vehicle wheels may be supported directly on the axle housing. Rear housing 38 defines an opening 58 sized relative to components of output shaft 44.

Referring now to FIGS. 3-8, a differential carrier housing 40 in accordance with the present invention will be described. Housing 40 includes a body 60, a flange 62, and a rib 64 in accordance with the present invention and may be of unitary (i.e., one-piece) construction.

Figure 4:
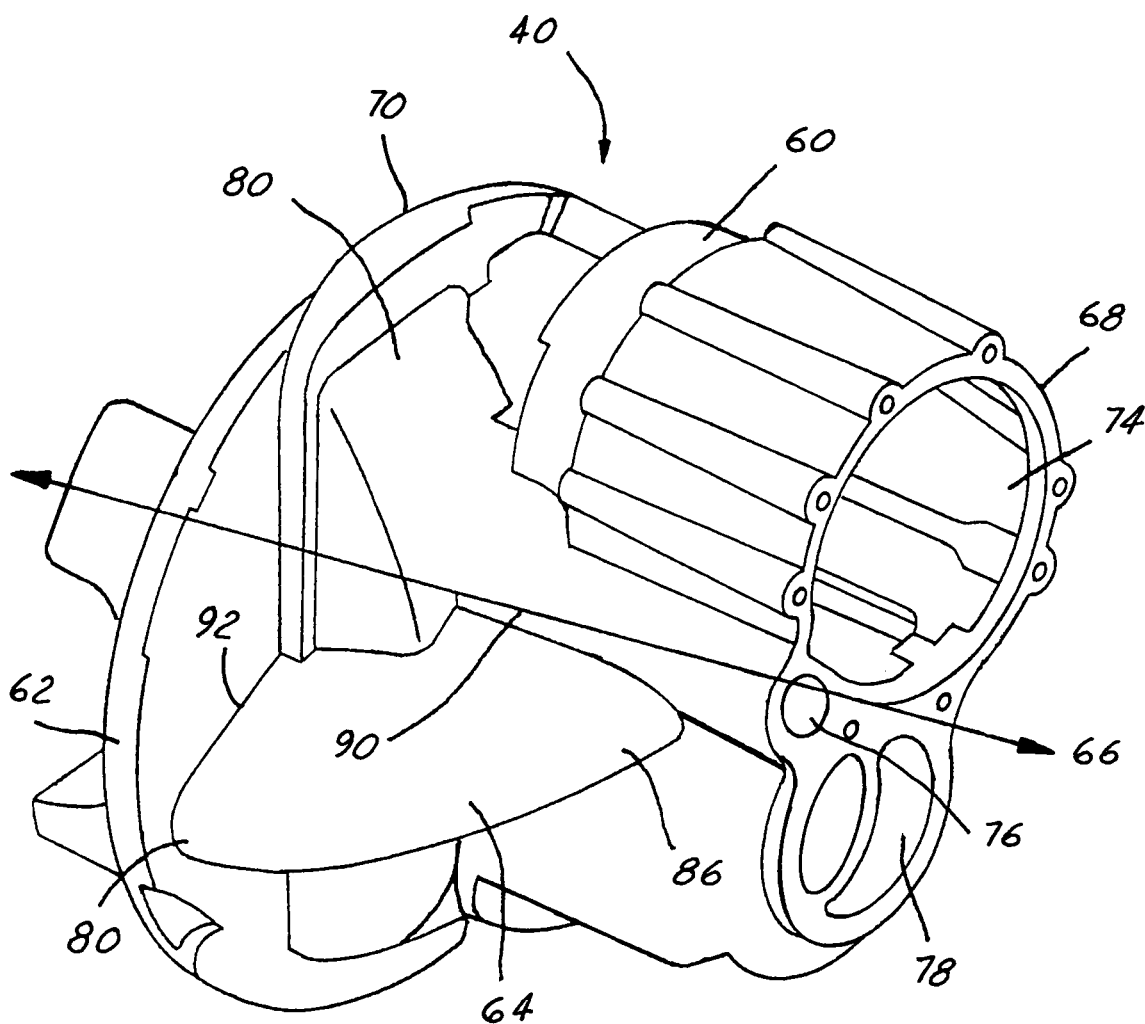
FIG. 4 is a perspective view of a differential carrier housing in accordance with the present invention.
Figure 5:
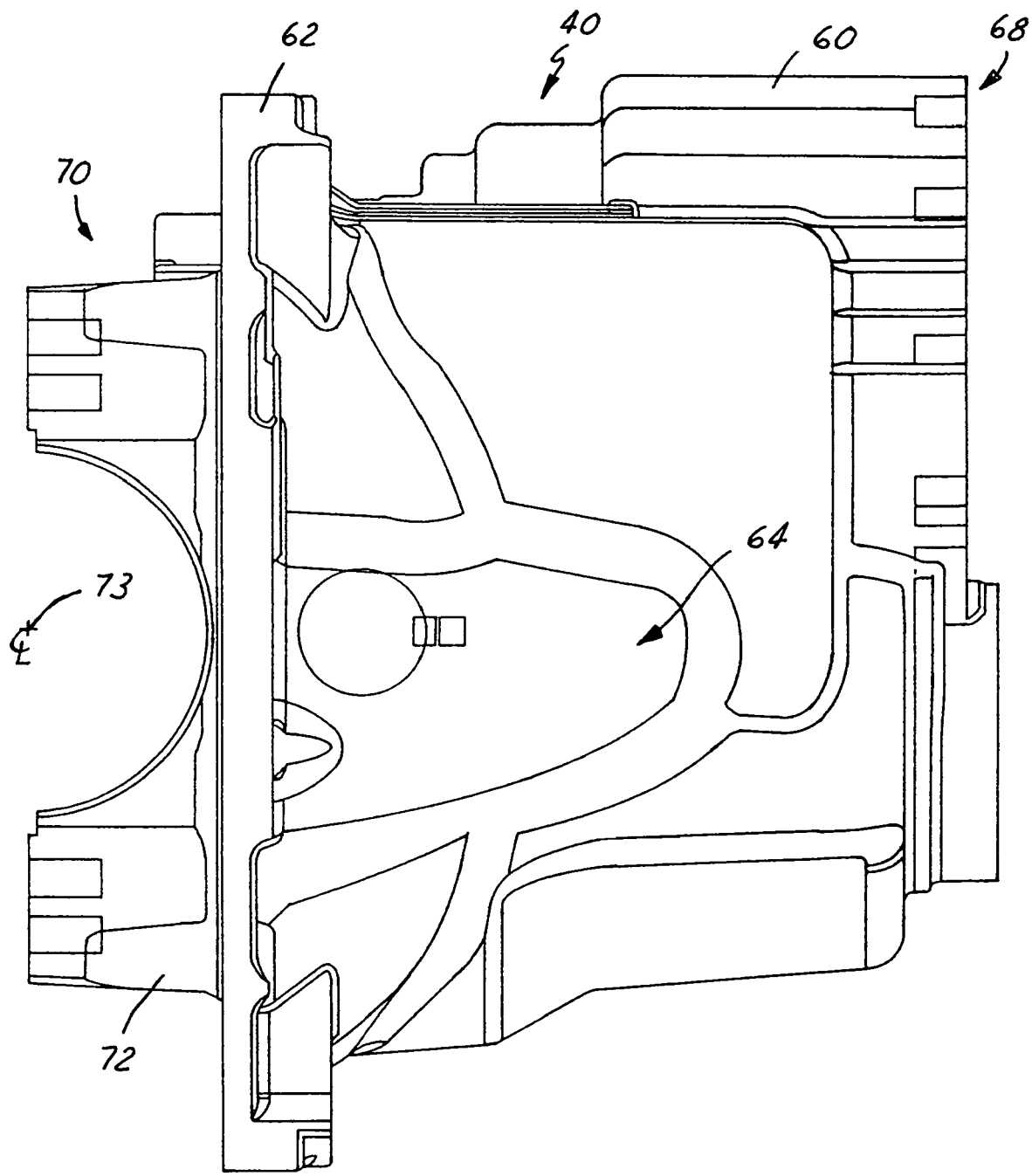
FIG. 5 is a side view of the differential carrier housing of FIG. 4.
Figure 6:
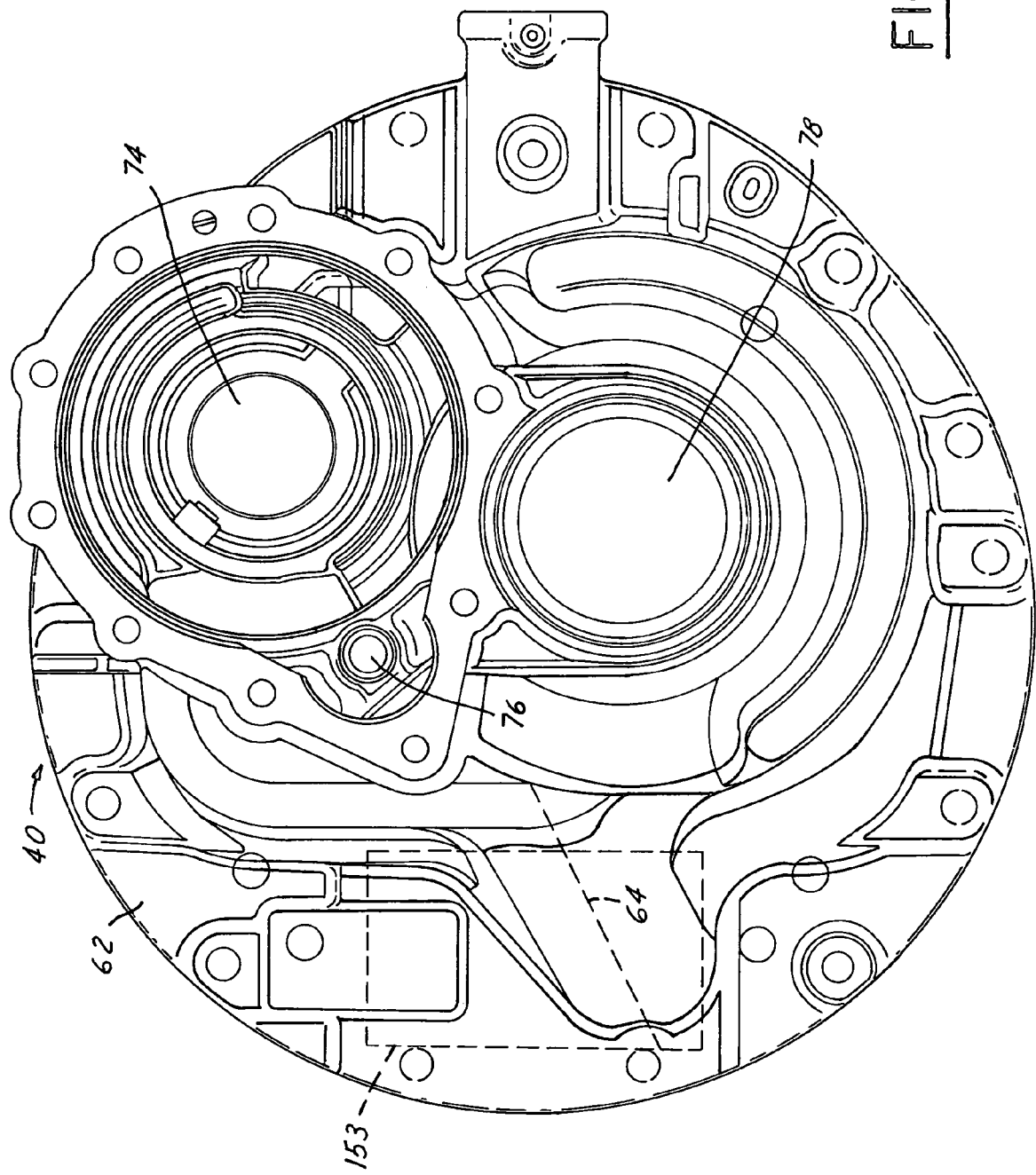
FIG. 6 is a forward view of the differential carrier housing of FIG. 4.
Figure 7:
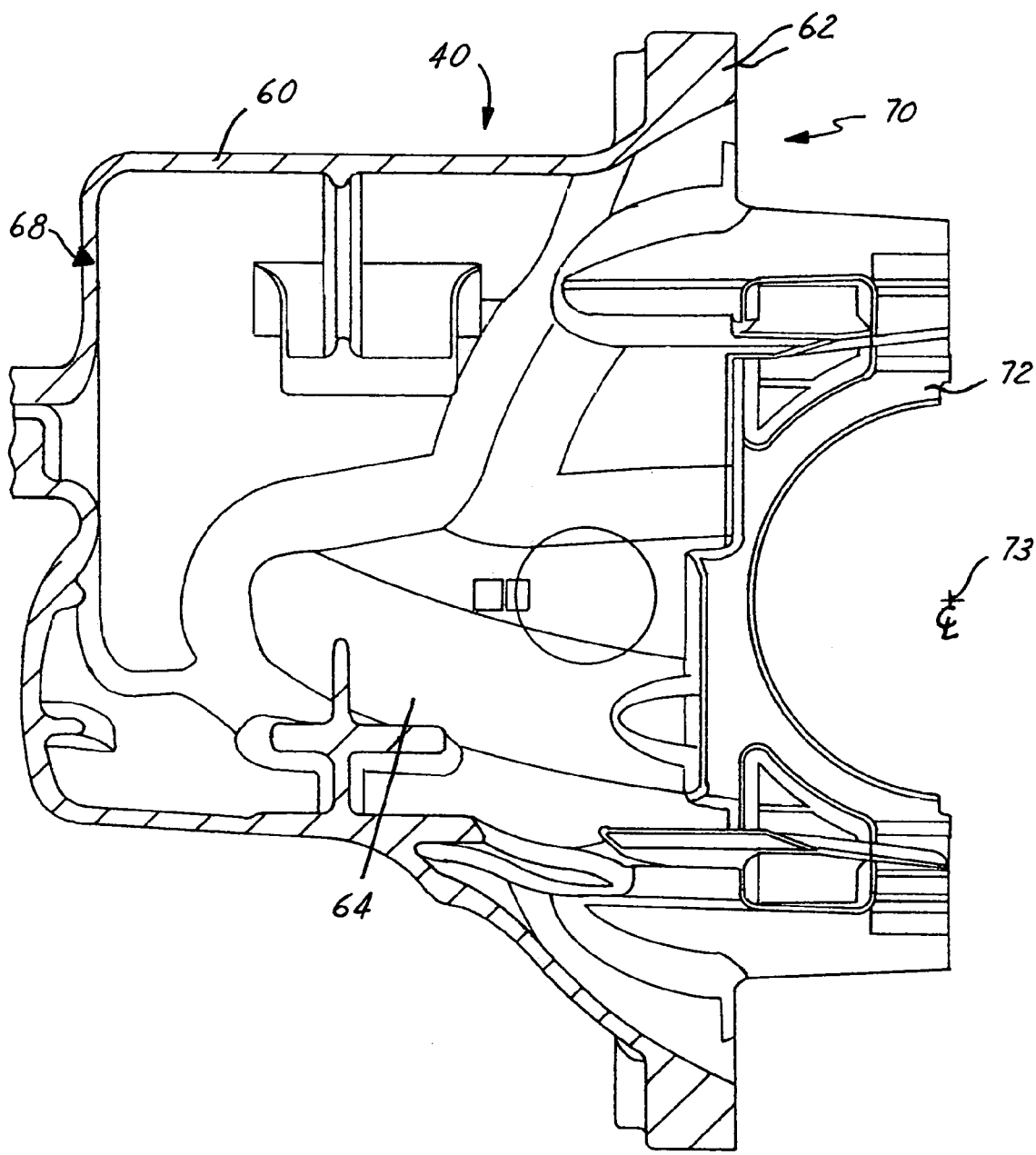
FIG. 7 is a cross-sectional view of the differential carrier housing of FIG. 4.
Figure 8:
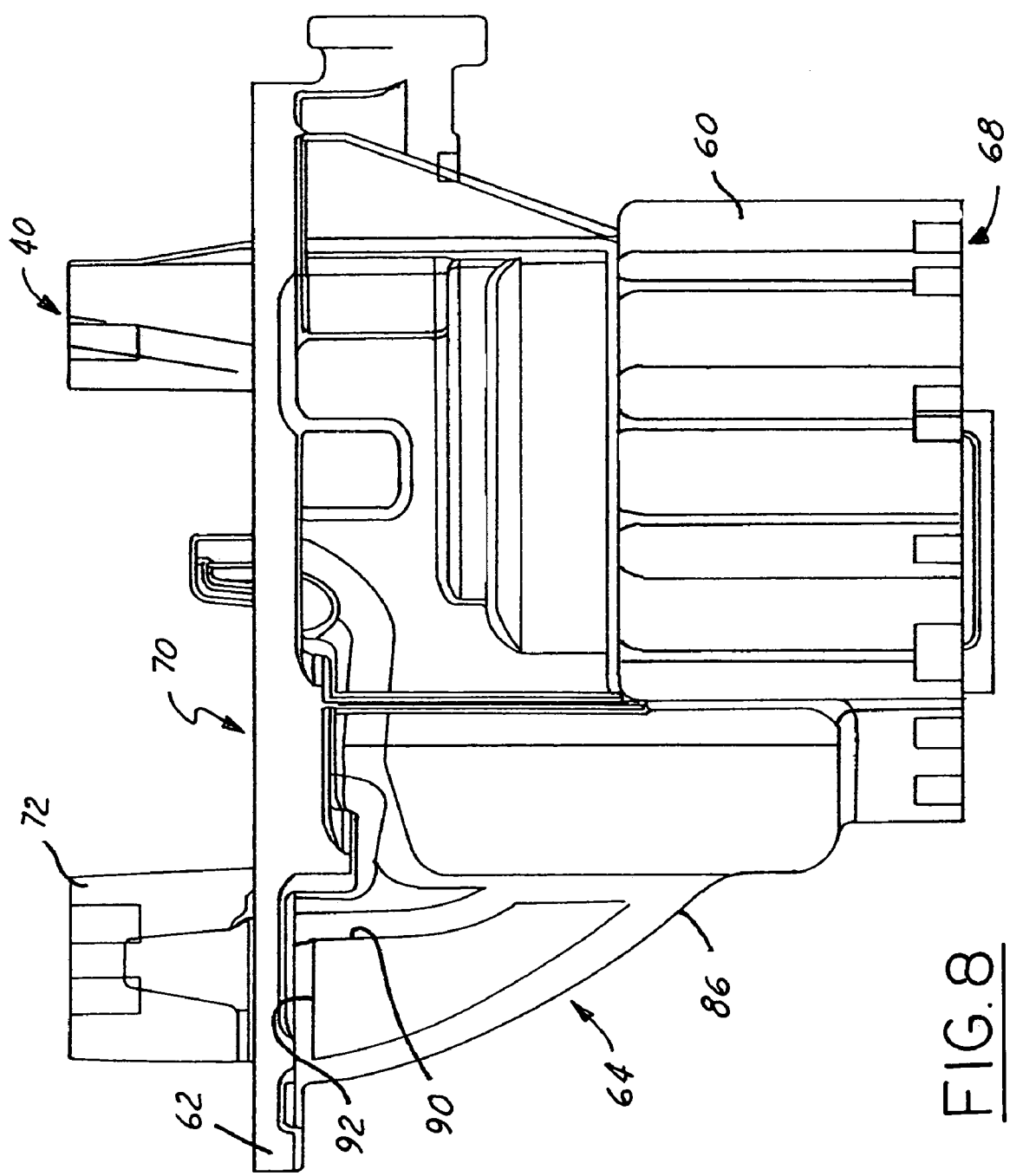
FIG. 8 is a top view of the differential carrier housing of FIG. 4.

Body 60 is disposed about an axis 66 and has a first axial end 68 and a second axial end 70. Referring to FIG. 5, end 70 defines a bearing support structure 72 for a set of bearings for a differential case which is centered about the centerline 73 of the forward axle. Referring to FIG. 4, body 60 may define cylindrical bores 74, 76, 78 configured to receive input shaft 42 and components of clutch 50 and pinion shaft assembly 52, respectively. Body 60 may also define a semicircular cavity 80 configured to receive a portion of differential gear assembly 54.

Flange 62 is provided for connecting carrier housing 40 to axle housing 36. Flange 62 extends radially outwardly from body 60 proximate end 68 of body 60. Referring to FIG. 3, flange 62 may include a plurality of apertures 82 configured to receive fasteners 84 such as screws, bolts, or pins for coupling housings 36, 40.

Rib 64 provides structural support and strength to housing 40 along the operational load path of assembly 16. Rib 64 is substantially pie-shaped and has a forward end 86 and a rear end 88. Rib 64 has an substantially axially extending face 90 that extends forwardly from flange 62 to forward end 86. Rib 64 also has a substantially radially extending face 92 at its rear end 88 that extends outwardly from cavity 80 of body 60 to a point radially inward of the radially outer edge of flange 62. Rib 64 is hollow and therefore reduces the weight of housing 40 relative to conventional housings having solid support ribs. Rib 64 has a constant wall thickness from forward end 86 to rear end 88. Further, rib 64 tapers from forward end 86 to rear end 88. Rib 64 is also positioned so as to provide increased strength to housing 40 relative to conventional carrier housings as discussed in greater detail hereinbelow.

Input shaft 42 transmits power from a power input shaft (not shown) at the forward end of forward axle assembly 16 to inter-axle differential 48 and is conventional in the art. Input shaft 42 is driven by the power input shaft through a conventional input yoke (not shown). The input yoke may be splined to the forward end of input shaft 42 on splines (not shown) and may be retained thereon by a nut 94 and a washer (not shown) which are disposed about a threaded stud 96 that extends from shaft 42 and is integral therewith. Shaft 42 is journalled for rotation within housing 40 by bearings 98 which may comprise tapered roller bearings. The bearing cone for bearings 98 is disposed about shaft 42 while the bearing cup is supported within a threaded adjuster 100 having a plurality of threads that engage corresponding threads on housing 40 proximate opening 74.

Pump 46 is provided to lubricate components of inter-axle differential 48 during the differential action between input shaft 42 and output shaft 44. Pump 46 may have the structure set forth in co-pending and commonly assigned U.S. patent application Ser. No. 10/186,926.

Output shaft 44 is provided to transmit a portion of the power provided by input shaft 42 to the intermediate drive shaft assembly 14 (shown in FIG. 1) extending between drive shaft assemblies 12, 16. Shaft 44 is coaxially disposed relative to input shaft 42. Shaft 44 extends through opening 58 of housing 38 and is journalled within opening 58 by bearings 102, 104. Shaft 44 transmits power to intermediate drive shaft assembly 14 through a conventional output yoke 26 (shown in FIG. 1). The output yoke may be splined to the rear end of output shaft 44 on splines 106 and may be retained thereon by a nut 108 and a washer (not shown) which are disposed about a threaded stud 110 that extends from shaft 44 and is integral therewith.

Inter-axle differential 48 is provided to divide power between forward axle assembly 16 and rear axle assembly 12 and is conventional in the art. Differential 48 may include a power divider subassembly 112, which, in turn, may include a spider 114 and bevel gears 116, an input gear 118, and an output gear 120.

Spider 114 provides a mounting arrangement for bevel gears 116 and is conventional in the art. Spider 114 may be coupled to input shaft 42 for rotation therewith using a spline connection or in other ways customary in the art.

Bevel gears 116 are provided to divide and transfer torque from input shaft 42 to input gear 118 (for driving pinion shaft assembly 52 of drive axle assembly 16) and to gear 120 (for driving output shaft 44). Gears 116 are conventional in the art and may be made from conventional metals and metal alloys. Gears 116 are mounted on spider 114 for rotation with spider 114 and input shaft 42. The teeth on gears 116 engage corresponding teeth on gears, 118, 120.

Input gear 118 transfers torque from inter-axle differential 48 (and indirectly from input shaft 42) to pinion shaft assembly 52. Gear 118 is also conventional in the art and may be made from conventional metals and metal alloys. Gear 118 is disposed about input shaft 42 and is freely rotatable thereon, being journalled on shaft 42 by bearings (not shown). Gear 118 includes a first set of teeth disposed on a rear planar surface that engage the teeth of bevel gears 116, a second set of teeth on a forward planar surface that engage clutch 50 and a third set of teeth disposed about the radial periphery of gear 118 for a purpose described hereinbelow.

Gear 120 transmits power received from inter-axle differential 48 to output shaft 44. Gear 120 is conventional in the art and may be made from conventional metals and metal alloys. Gear 120 is disposed about shaft 44 near the forward end of shaft 44 and may be coupled thereto by mating splines (not shown) on gear 120 and shaft 44. Gear 120 is journalled for rotation within housing 40 by bearings 122.

Clutch 50 is provided to selectively lock inter-axle differential 48 and is conventional in the art. In the illustrated embodiment, clutch 50 comprises a conventional sliding dog clutch and includes a clutch member 124 having a set of teeth on a rearward side configured to engage corresponding teeth on input gear 118. Clutch 50 is engaged/disengaged by shifting clutch member 124 into engagement/disengagement with a input gear 118 using a shift fork or in other conventional ways.

Pinion shaft assembly 52 transfers torque from input gear 118 to differential gear assembly 54. Assembly 52 may include outer and inner bearings 126, 128, a driven gear 130, a pinion shaft 132, and a pinion gear 134.

Bearings 126, 128 enable rotation of pinion shaft 132 relative to forward and rear pinion bearing support structures 136, 138 defined in carrier housing 40. Bearings 126, 128 are conventional in the art and may comprise tapered roller bearings. Bearings 126, 128 are disposed within coaxial openings in support structures 136, 138.

Driven gear 130 transmits torque from input gear 118 of inter-axle differential 48 to pinion shaft 132. Driven gear 130 may comprise a helical gear having teeth disposed about its radial periphery which engage corresponding teeth on input gear 118. Gear 130 may be drivingly coupled to shaft 132 through axially-extending splines (not shown) on shaft 132. Gear 130 may be disposed between support structures 136, 138 thereby allowing accurate positioning of gear 130.

Pinion shaft 132 transmits torque to pinion gear 134 and is conventional in the art. Shaft 132 is supported for rotation within housing 40 by bearings 126, 128. A first (or forward) end 140 of shaft 132 may define an integral threaded shank 142 extending outwardly through forward opening 78 in housing 40 and configured to receive nut 144. A second (or rear) end 146 of shaft 132 is configured to receive pinion gear 134 thereon.

Pinion gear 134 transmits torque to differential gear assembly 52 and is also conventional in the art. Pinion gear 134 may comprise a hypoid gear and may be coupled to end 146 of shaft 132 using a spline connection or in other ways customary in the art or may be integral with pinion shaft 132.

Differential gear assembly 54 is provided to enable the wheels (not shown) on opposite sides of drive axle assembly 16 to rotate at different speeds. Gear assembly 54 is substantially disposed within axle housing 36. Assembly 54 is conventional in the art and includes a ring gear 148 and a conventional wheel differential 150. Referring to FIG. 3, differential 150 may include a differential case 152 coupled to ring gear 148 for rotation therewith in a conventional manner and rotatably supported within housing 36 by bearings 153, one set of which is shown schematically in FIG. 6. Differential 150 may further include a spider 154 mounted to case 152 for rotation therewith and a plurality of differential gears 156 mounted on spider and configured to divide power between side gears coupled to axle half shafts extending from axle assembly 16.

As mentioned hereinabove, the position of rib 64 on carrier housing 40 provides increased strength to housing 40. Forward end 86 of rib 64 is located on body 60 rearward of bearings 98 supporting input shaft 42. End 86 may also be forward of the outer bearings 126 for pinion shaft 132 such that end 86 is located between input shaft bearings 98 and bearings 126. End 86 may also be located above centerline 73 of the forward axle. Rear end 88 of rib 64 is located at flange 62 of housing 40. End 88 may also be aligned with at least a portion of bearing support structure 72 and the bearings 153 supported thereon supporting case 152 of wheel differential 150. Finally, end 88 may be located below centerline 73 of the forward axle. The arrangement of the material is such that the bearing reaction loads tend to oppose each other. The forces are bridged from input bearings 98 and pinion bearings 126, 128 to differential bearings 153 that push in opposite directions.

While the invention has been particularly shown and described with reference to the preferred embodiments thereof, it is well understood by those skilled in the art that various changes and modifications can be made in the invention without departing from the spirit and scope of the invention.

We claim:

1. A differential carrier housing, comprising:
   a body disposed about an axis and having first and second axial ends, said body configured to receive a pinion shaft, an inter-axle differential, and an input shaft supported on an input shaft bearing;
   a radially extending flange extending from said body proximate said second axial end of said body and configured for connection to an axle housing; and,
   a hollow rib extending from a forward end located on said body rearward of said input shaft bearing to a rear end located at said flange.

2. A differential carrier housing according to claim 1, wherein said hollow rib has a constant wall thickness from said forward end to said rear end.

3. A differential carrier housing according to claim 1, wherein said hollow rib tapers from said forward end to said rear end.

4. A differential carrier housing, comprising:
   a body disposed about an axis and having first and second axial ends, said body configured to receive a pinion shaft, an inter-axle differential, and an input shaft supported on an input shaft bearing;
   a radially extending flange extending from said body proximate said second axial end of said body and configured for connection to an axle housing; and,
   a hollow rib extending from a forward end located on said body rearward of said input shaft bearing to a rear end located at said flange, wherein said forward end of said hollow rib is above a centerline of an axle, and said rear end of said hollow rib is below said centerline of said axle.

5. A differential carrier housing according to claim 1, wherein said rear end of said hollow rib is aligned with a bearing support for a differential case of a wheel differential.

6. A differential carrier housing according to claim 1, wherein said forward end of said hollow rib is located between said input shaft bearing and an outer bearing for said pinion shaft.

7. A differential carrier housing, comprising:
   a body disposed about an axis and having first and second axial ends, said body configured to receive a pinion shaft, an inter-axle differential, and an input shaft supported on an input shaft bearing;
   a radially extending flange extending from said body proximate said second axial end of said body and configured for connection to an axle housing; and,
   a hollow rib extending from a forward end located on said body rearward of said input shaft bearing to a rear end located at said flange, wherein said forward end is located between said input shaft bearing and an outer bearing for said pinion shaft, and said rear end is aligned with a bearing support for a differential case of a wheel differential.

8. A differential carrier housing according to claim 7, wherein said hollow rib has a constant wall thickness from said forward end to said rear end.

9. A differential carrier housing according to claim 7, wherein said hollow rib tapers from said forward end to said rear end.

10. A differential carrier housing, comprising:
    a body disposed about an axis and having first and second axial ends, said body configured to receive a pinion shaft, an inter-axle differential, and an input shaft supported on an input shaft bearing;
    a radially extending flange extending from said body proximate said second axial end of said body and configured for connection to an axle housing; and,
    a hollow rib extending from a forward end located on said body rearward of said input shaft bearing to a rear end located at said flange, wherein said forward end is located between said input shaft bearing and an outer bearing for said pinion shaft, and said rear end is aligned with a bearing support for a differential case of a wheel differential, wherein said forward end of said hollow rib is above a centerline of an axle, and said rear end of said hollow rib is below said centerline of said axle.

11. A tandem axle assembly, comprising:
a first axle assembly having a wheel differential;
a second axle assembly having a wheel differential;
wherein one of said first and second axle assemblies includes a differential carrier housing having:
a body disposed about an axis and having first and second axial ends, said body configured to receive a pinion shaft, an inter-axle differential drivingly coupled to said wheel differentials of said first and second axle assemblies, and an input shaft supported on an input shaft bearing;
a radially extending flange extending from said body proximate said second axial end of said body and configured for connection to an axle housing; and,
a hollow rib extending from a forward end located on said body rearward of said input shaft bearing to a rear end located at said flange.

12. A tandem axle assembly according to claim 11, wherein said hollow rib has a constant wall thickness from said forward end to said rear end.

13. A tandem axle assembly according to claim 11, wherein said hollow rib tapers from said forward end to said rear end.

14. A tandem axle assembly, comprising:
a first axle assembly having a wheel differential;
a second axle assembly having a wheel differential;
wherein one of said first and second axle assemblies includes a differential carrier housing having:
a body disposed about an axis and having first and second axial ends, said body configured to receive a pinion shaft, an inter-axle differential drivingly coupled to said wheel differentials of said first and second axle assemblies, and an input shaft supported on an input shaft bearing;
a radially extending flange extending from said body proximate said second axial end of said body and configured for connection to an axle housing; and,
a hollow rib extending from a forward end located on said body rearward of said input shaft bearing to a rear end located at said flange, wherein said forward end of said hollow rib is above a centerline of an axle, and said rear end of said hollow rib is below said centerline of said axle.

15. A tandem axle assembly according to claim 11, wherein said rear end of said hollow rib is aligned with a bearing support for a differential case of a wheel differential.

16. A tandem axle assembly according to claim 11, wherein said forward end of said hollow rib is located between said input shaft bearing and an outer bearing for said pinion shaft.

* * * * *